United States Patent
Shibasaki

(10) Patent No.: US 9,134,588 B2
(45) Date of Patent: Sep. 15, 2015

(54) STOP APPARATUS, AND LENS APPARATUS AND IMAGE PICKUP APPARATUS HAVING THE SAME

(71) Applicant: CANON KABUSHIKI KAISHA, Tokyo (JP)

(72) Inventor: Gou Shibasaki, Utsunomiya (JP)

(73) Assignee: CANON KABUSHIKI KAISHA (JP)

( * ) Notice: Subject to any disclaimer, the term of this patent is extended or adjusted under 35 U.S.C. 154(b) by 0 days.

(21) Appl. No.: 14/452,711

(22) Filed: Aug. 6, 2014

(65) Prior Publication Data
US 2015/0043903 A1    Feb. 12, 2015

(30) Foreign Application Priority Data

Aug. 8, 2013    (JP) ................. 2013-164810

(51) Int. Cl.
   *G03B 9/02*    (2006.01)
   *G03B 9/06*    (2006.01)
(52) U.S. Cl.
   CPC ........................................ *G03B 9/06* (2013.01)
(58) Field of Classification Search
   USPC ......................................................... 396/510
   See application file for complete search history.

(56) References Cited

U.S. PATENT DOCUMENTS

| | | | | |
|---|---|---|---|---|
| 3,308,735 A | * | 3/1967 | Spiessl ........................ | 396/510 |
| 4,772,904 A | * | 9/1988 | Otsuka et al. ................ | 396/508 |
| 5,749,015 A | * | 5/1998 | Sato et al. .................... | 396/508 |
| 7,085,032 B2 | * | 8/2006 | Sato ............................. | 359/230 |
| 7,559,709 B2 | * | 7/2009 | Oh ............................... | 396/510 |
| 2009/0232491 A1 | * | 9/2009 | Masuda et al. ............... | 396/510 |
| 2012/0057859 A1 | * | 3/2012 | Byon et al. ................... | 396/510 |

FOREIGN PATENT DOCUMENTS

| | | |
|---|---|---|
| JP | 3-182709 A | 8/1991 |
| JP | 2836762 B2 | 12/1998 |
| JP | 2004-294678 A | 10/2004 |
| JP | 2009-53434 A | 3/2009 |
| JP | 2012-123299 A | 6/2012 |

* cited by examiner

*Primary Examiner* — Clayton E Laballe
*Assistant Examiner* — Dennis Hancock
(74) *Attorney, Agent, or Firm* — Rossi, Kimms & McDowell LLP

(57) ABSTRACT

A stop apparatus includes a stop operation member, a plurality of stop blades, each of which is provided with a pivot and a driving pin, a blade supporter that supports the stop blades in such a way that the stop blades are rotatable about the pivots of the respective stop blades, a first cam member provided with a first cam groove with which the driving pins of the respective stop blades engage, a second cam member provided with a second cam groove having a shape different from the first cam groove, and a driving force transmission member that transmits rotational driving force of the stop operation member to the second cam member. At least one of the driving pins engages with both the first cam groove and the second cam groove.

12 Claims, 8 Drawing Sheets

STOP APPARATUS, AND LENS APPARATUS AND IMAGE PICKUP APPARATUS HAVING THE SAME

BACKGROUND OF THE INVENTION

1. Field of the Invention

The present invention relates to a stop apparatus used in a lens apparatus for image taking and more particularly to a stop apparatus in which the aperture diameter is varied by a rotational operation. The present invention also relates to a lens apparatus and an image pickup apparatus having such a stop apparatus.

2. Description of the Related Art

There has been known heretofore a stop apparatus having a plurality of stop blades each having a pivot that are arranged in the same circumference at regular angular intervals so that a stop aperture defined by overlapping edges of the stop blades can be varied with swinging of the stop blades about the respective pivot shafts. In a typical stop apparatus of this type, each blade is provided with a pivot pin and a driving pin, and the position of the driving pin relative to the pivot pin, which is supported at a fixed position, is guided by a cam groove formed in a disk-like cam plate.

For example, Japanese Patent Application Laid-Open No. 2004-294678 discloses a stop apparatus in which pivot pins of six stop blades are fitted to engagement holes provided on a blade supporter, and the stop aperture size is varied by rotating a cam plate having six cam grooves engaging with the driving pins of the respective blades. When this stop apparatus is built in a lens apparatus, the cam plate is directly linked with a rotational operation member to allow manual adjustment of light quantity.

The shape of the stop aperture affects the quality of image blur characteristics (so-called "bokeh") in background regions around the main subject in taken images. Specifically, the more circular the shape of the stop aperture is, the better the blur characteristics in images can be. A typically used method of making the stop aperture shape closer to a circle is to increase the number of stop blades. Japanese Patent Application Laid-Open No. 2012-123299 discloses a stop apparatus having an aperture shape made closer to a circle by the use of as many as fourteen stop blades.

For the above-described reason, stop apparatuses are desired to have a stop aperture that is close to a circle in shape and to have a large rotational operation angle in manual operation in order to allow fine adjustment of the light quantity. Both the aspects mentioned above are required particularly in the case of lens apparatuses that need to generate aesthetically fine images and to allow fine light quantity adjustment, as is the case with cinema lenses.

However, in the prior arts disclosed in the above-mentioned Japanese Patent Application Laid-Open Nos. 2004-294678 and 2012-123299, it is difficult to achieve a large rotational operation angle while using a large number of stop blades, because it is necessary to prevent the cam grooves for guiding the driving pins of the stop blade from interfering with each other. Consequently, the conventional stop apparatuses that use a large number of stop blades in order to make the shape of the stop aperture close to a circle cannot allow fine adjustment of the light quantity using an operation member. This deteriorates the usability of the lens apparatuses in image taking.

On the other hand, as disclosed in Japanese Patent Application Laid-Open No. H03-182709 there has also been known a structure that enlarges the rotation angle of a manipulated member relative to the rotation angle of a rotary member in a lens apparatus by means of a differential mechanism using rollers. However, the use of this structure in a stop apparatus leads to a problem of increased overall size of the stop apparatus including the differential mechanism.

SUMMARY OF THE INVENTION

In view of the above-described circumstances, an object of the present invention is to provide a compact stop apparatus allowing fine adjustment of the light quantity with a large rotational operation angle while having a stop aperture that is formed by a large number of stop blades to have a nearly circular shape.

To achieve the above object, the stop apparatus according to the present invention comprises a stop operation member, a plurality of stop blades, each of which is provided with a pivot and a driving pin, a blade supporter that supports the stop blades in such a way that the stop blades are rotatable about the pivots of the respective stop blades, a first cam member provided with a first cam groove with which the driving pins of the respective stop blades engage, a second cam member provided with a second cam groove having a shape different from the first cam groove, and a driving force transmission member that transmits rotational driving force of the stop operation member to the second cam member, wherein at least one of the driving pins engages with both the first cam groove and the second cam groove.

According to the present invention there can be provided a compact stop apparatus allowing fine adjustment of the light quantity with a large rotational operation angle while having a stop aperture that is formed by a large number of stop blade to have a nearly circular shape.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

Exemplary embodiments of the present invention will be described with reference to FIGS. 1 to 8.

First Embodiment

Figure 1:
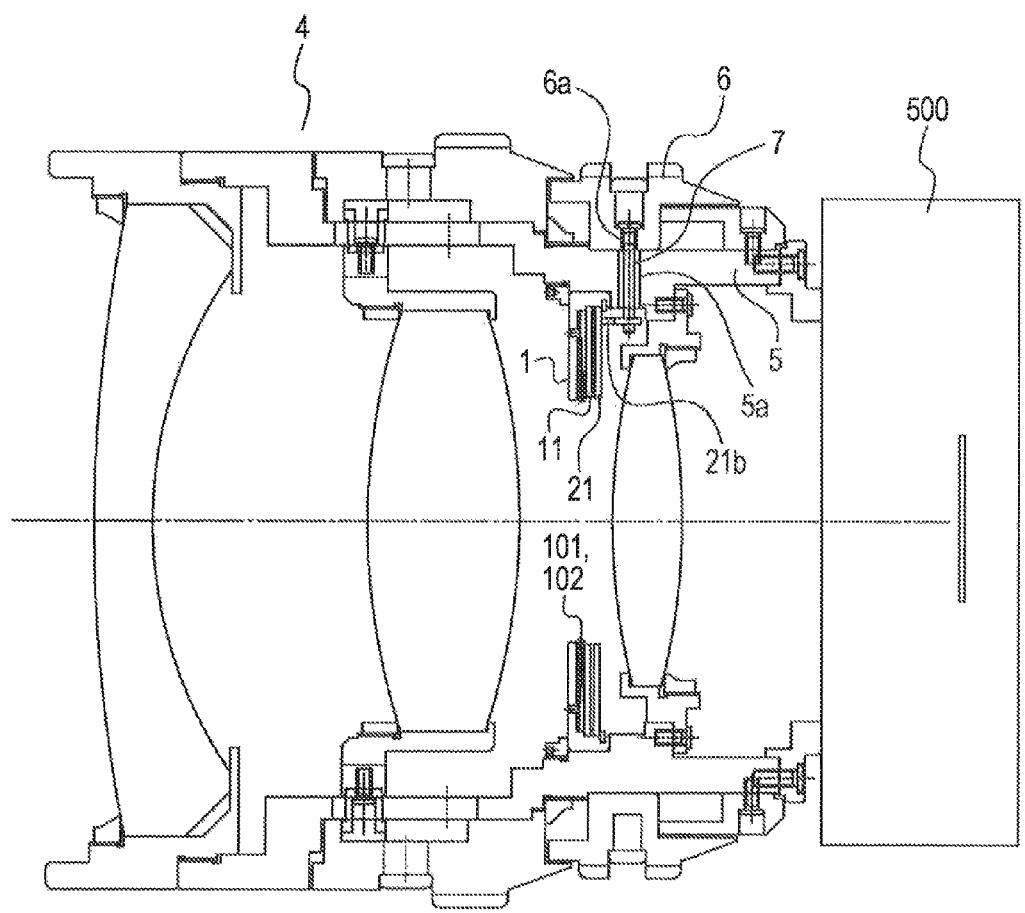
FIG. 1 is a side cross sectional view of a lens apparatus including a stop apparatus according to a first embodiment.

FIG. 1 is a side cross sectional view of an image pickup apparatus having a lens apparatus with a stop apparatus according to a first embodiment.

Figure 2:
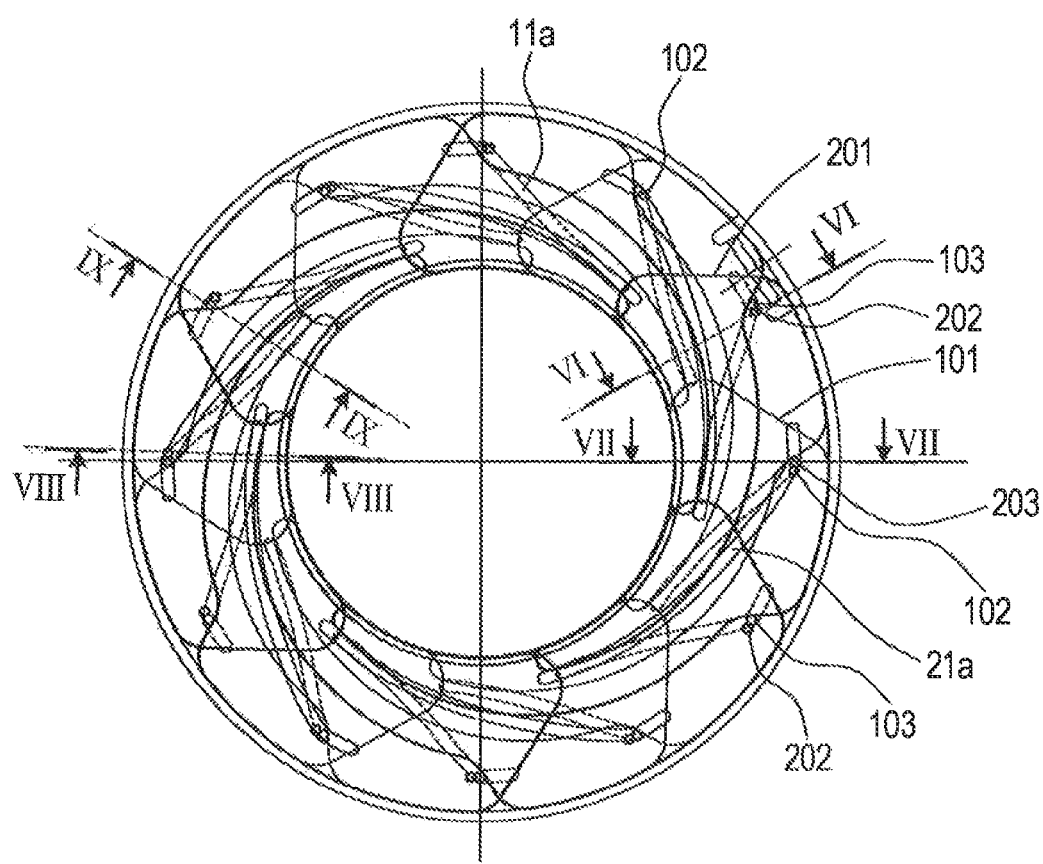
FIG. 2 is a perspective view showing relevant parts of the stop apparatus according to the first embodiment.
Figure 3A:
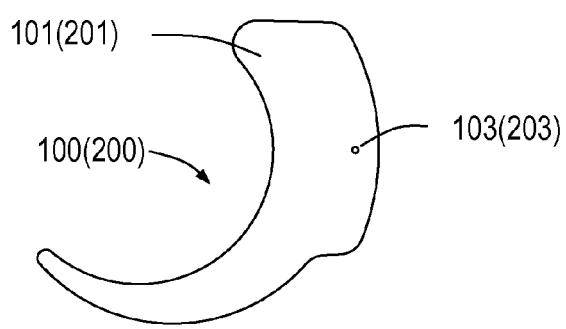
FIG. 3A is a view of the stop blades according to the first embodiment seen from the image pickup apparatus side.
Figure 3B:
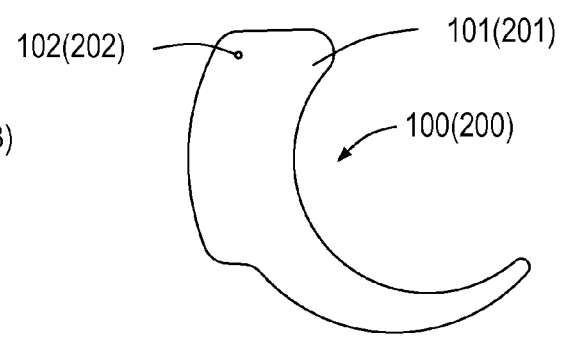
FIG. 3B is a view of the stop blades according to the first embodiment seen from the object side.
Figure 4:
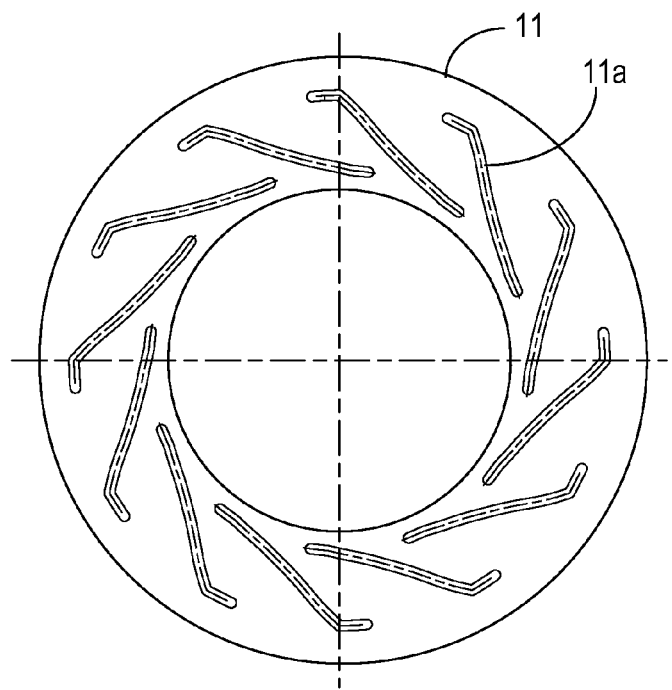
FIG. 4 is a diagram showing the arrangement of cam grooves in a first cam plate in the stop apparatus according to the first embodiment.
Figure 5:
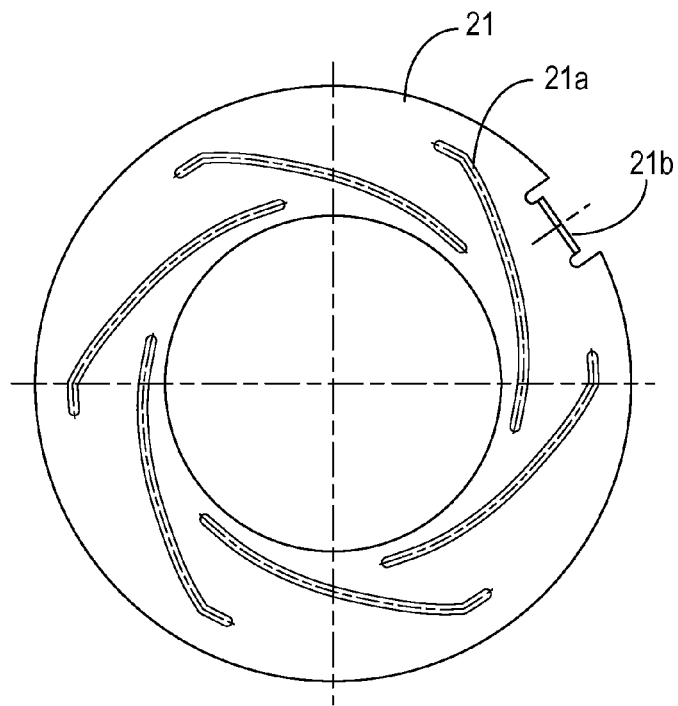
FIG. 5 is a diagram showing the arrangement of cam grooves in a second cam plate in the stop apparatus according to the first embodiment.
Figure 6:
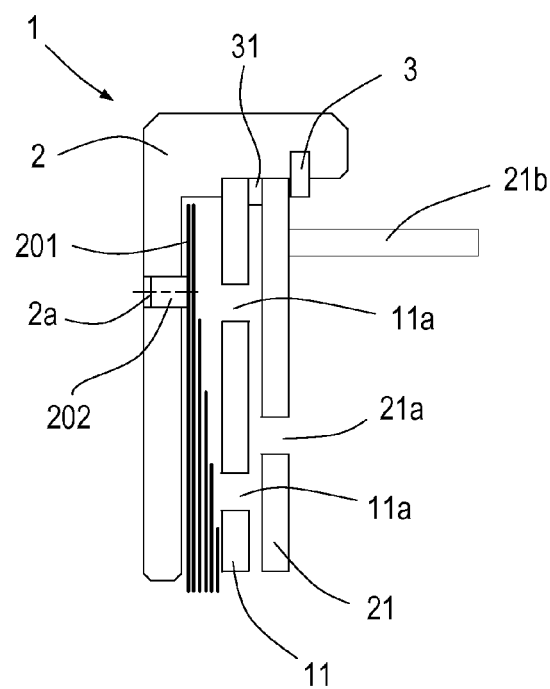
FIG. 6 is a partial side cross sectional view taken along line VI-VI in FIG. 2.
Figure 7:
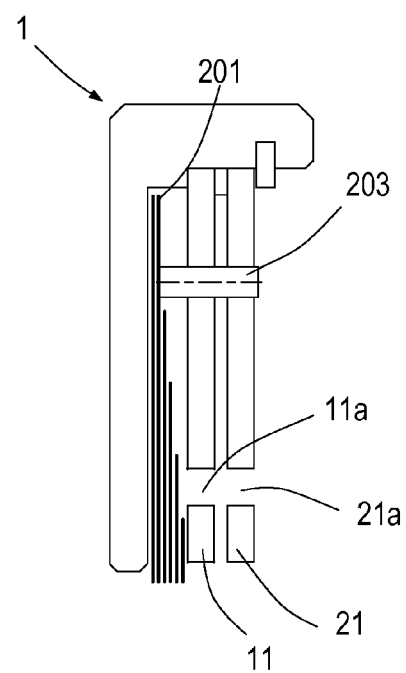
FIG. 7 is a partial cross sectional view taken along line VII-VII in FIG. 2.
Figure 8:
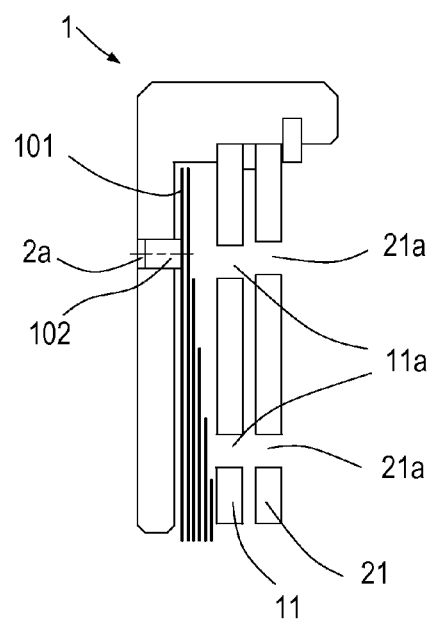
FIG. 8 is a partial cross sectional view taken along line VIII-VIII in FIG. 2.
Figure 9:
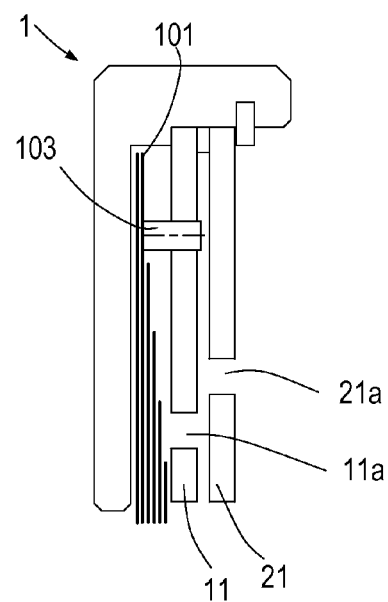
FIG. 9 is a partial cross sectional view taken along line IX-IX in FIG. 2.

FIG. 2 is a perspective view showing relevant parts of the stop apparatus according to the first embodiment to which the present invention is applied. The relevant parts shown in FIG. 2 include first stop blades 100, second stop blades 200, a first cam plate (first cam member) 11, and a second cam plate (second cam member) 21. FIG. 3A is a view of the stop blades 101, 201 seen from the image pickup apparatus side. FIG. 3B is a view of the stop blades 101, 201 seen from the object side. FIG. 4 is a diagram showing the arrangement of cam grooves in the first cam plate 11. FIG. 5 is a diagram showing the arrangement of cam grooves in the second cam plate 21. FIG. 6 is a partial side cross sectional view taken along line VI-VI in FIG. 2. FIG. 7 is a partial cross sectional view taken along line VII-VII in FIG. 2. FIG. 8 is a partial cross sectional view taken along line VIII-VIII in FIG. 2. FIG. 9 is a partial cross sectional view taken along line IX-IX in FIG. 2. In FIGS. 1 and 6 to 9, the left side is the object side. When used for image taking, the lens apparatus 4 is coupled, on its right side in these drawings, to a camera apparatus 500 having an image pickup element 510 that photoelectrically converts an optical image formed by the lens apparatus to constitute an image pickup apparatus.

The stop apparatus (optical component) 1 is composed of a stop blade supporting cylinder (blade supporter) 2, the two types of stop blades 100, 200, the two types of cam plates 11, 12, and a press washer 3, as shown in FIGS. 1 and 6 to 9.

The two types of stop blades include first stop blades 100 and second stop blades 200, and each stop blade is provided with a pivot pin 102, 202 projecting from its object side surface as shown in FIG. 3A and a driving pin 103, 203 projecting from the opposite surface facing toward the image pickup apparatus as shown in FIG. 3B. The plate parts 101, 201 of these two types of stop blades have the same shape as shown in FIGS. 3A and 3B. As to the lengths of the driving pins 103, 203 projecting from the stop blades, the driving pins 203 on the second stop blades 200 are longer than the driving pins 103 on the first stop blades 100 as shown in FIGS. 7 and 9. The plurality of stop blades used in this embodiment include six first stop blades 100 and six second stop blades 200, which are arranged in an overlapping manner as shown in FIG. 2 with the pivot pins 102, 202 engaging with engagement holes 2a provided on the stop blade supporting cylinder 2 (see FIGS. 6 and 8).

The stop apparatus 1 further has a first cam plate 11 and a second cam plate 21, which are arranged side by side on the image pickup apparatus side of the two types of stop blades 100, 200 in the mentioned order from the stop blade side. The first cam plate 11 and the second cam plate 21 are smoothly rotatable relative to the stop blade supporting cylinder 2. The two types of stop blades 100, 200 are arranged between the first cam plate 11 and the stop blade supporting cylinder 2. An annular slide washer 31 is provided between the first cam plate 11 and the second cam plate 21. The slide washer 31 is a friction member that is in contact with and held between the first cam plate 11 and the second cam plate 21. Because of the slide washer 31, frictional force acts between the first cam plate 11 and the second cam plate 21. Thus, when a force that rotates the second cam plate 21 is exerted on it by a stop operation ring (stop operation member) 6 or the like, a force acts also on the first cam plate 11 in the same direction, leading to a reduction in the force needed to cause the first cam plate 11 to start to rotate in the same direction. The first cam plate 11, the second cam plate 21, and the slide washer 31 are prevented from shifting in the optical axis direction by a press washer 3.

The first cam plate 11 is provided with twelve first cam grooves 11a as shown in FIG. 4. The driving pins 103 of the first stop blade 100 and the driving pins 203 of the second stop blade 200 alternately engage with the first cam grooves 11a.

With the above-described structure, as the first cam plate 11 is rotated about the optical axis relative to the stop blade supporting cylinder 2, the driving pins 103, 203 are guided along the first cam grooves 11a, so that the stop blades 100, 200 swing or pivot around the respective pivot pins 102, 202. The six first stop blades 100 and the six second stop blades 200 operating in the same manner can vary the aperture diameter of the stop formed by the overlapping stop blades 100, 200. When the driving pins 103, 203 are located at the positions farthest from the optical axis in the respective first cam grooves 11a, the stop is fully open (full aperture). Moreover, the cam grooves 11a are shaped in such a way that the aperture diameter of the stop becomes smallest when the driving pins 103, 203 are located at the positions closest to the optical axis in the respective first cam grooves 11a.

The second cam plate 21, which is arranged adjacent to the first cam plate 11 with the slide washer 31 between, is provided with six second cam grooves 21a, as shown in FIG. 5. The distance from the optical axis to the portions of the second cam grooves 21a farthest from the optical axis is equal to the distance from the optical axis to the portions of the first cam grooves 11a farthest from the optical axis. Moreover, the distance from the optical axis to the portions of the second cam grooves 21a closest to the optical axis is equal to the distance from the optical axis to the portions of the first cam grooves 11a closest to the optical axis. The driving pins 203 of the six second stop blades 200 engage with the six second cam grooves 21a respectively.

With the above-described structure, as the second cam plate 21 is rotated about the optical axis relative to the stop blade supporting cylinder 2, the driving pins 203 are guided along the second cam grooves 21a, so that the stop blades 200 swing around the respective pivot pins 202. Since the driving pins 203 of the stop blades 200 directly engage with the second cam grooves 21a of the second cam plate 21, the driving pins 203 of the stop blades 200 directly receive force from the second cam plate 21 as it rotates, so that the stop blades 200 swing. Moreover, since the driving pins 203 of the stop blades 200 engage with the first cam grooves 11a of the first cam plate 11, the rotation of the second cam plate 21 causes the first cam plate 11 also to rotate. As the first cam plate 11 rotates, the stop blades 100 receive force through the driving pins 103 engaging with the first cam grooves 11a of the first cam plate 11 to swing around the respective pivot pins 102.

In this embodiment, the rotation angle through which the second cam plate 21 rotates as the driving pins 203 shift from the positions farthest from the optical axis to the positions closest to the optical axis in the second cam grooves 21a is larger than, or specifically twice as large as, the rotation angle through which the first cam plate 11 rotates as the aperture diameter of the stop changes from the full aperture to the smallest aperture.

As shown in FIG. 1, the stop apparatus 1 according to this embodiment is fixed to the inner circumference of the fixed barrel 5 of the lens apparatus 4. The stop operation ring (stop operation member) 6 having engraved indices indicating the brightness on its outer circumference engages the outer circumference of the fixed barrel 5. The engaging part of the stop operation ring 6 can rotate smoothly. The operating ring 6 has a screw hole 6a, to which a stop interlock pin 7 extending into the inside of the fixed barrel 5 is screwed. A portion of the engaging part of the fixed barrel 5 that engages the stop operation ring 6 is provided with a long groove 5a, through which the stop interlock pin 7 passes so that the stop interlock pin 7 can rotate integrally with the stop operation ring 6 without interfering with the fixed barrel 5 over a rotational operation range of the stop. The end of the stop interlock pin 7 engages with an engagement groove provided on a connection arm 21b extending from the second cam plate 21 of the stop apparatus 1. In this structure, the interlock pin 7 functions as a driving force transmission member that transmits the rotational driving force of the stop operation ring 6 to the second cam plate 21. While in the illustrative case shown in FIG. 1, the connection arm 21b extends toward the camera apparatus 500 (or toward the image pickup element 510), the direction in which the connection arm 21b extends is not limited to this. The connection arm 21b may extend in any direction, so long as rotational driving force is transmitted to the second cam plate 21 by the rotation of the stop operation ring 6 about the optical axis.

How the stop apparatus 1 according to this embodiment having the above-described structure operates with stop operations will be described in the following with reference to FIGS. 10A, 10B, and 10C.

Figure 10A:
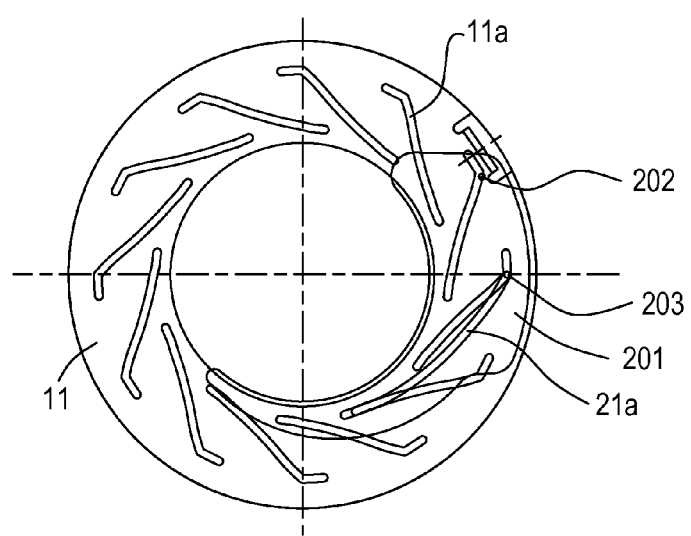
FIG. 10A is a diagram showing relationship between two types of cam grooves and stop blades in the first embodiment.
Figure 10B:
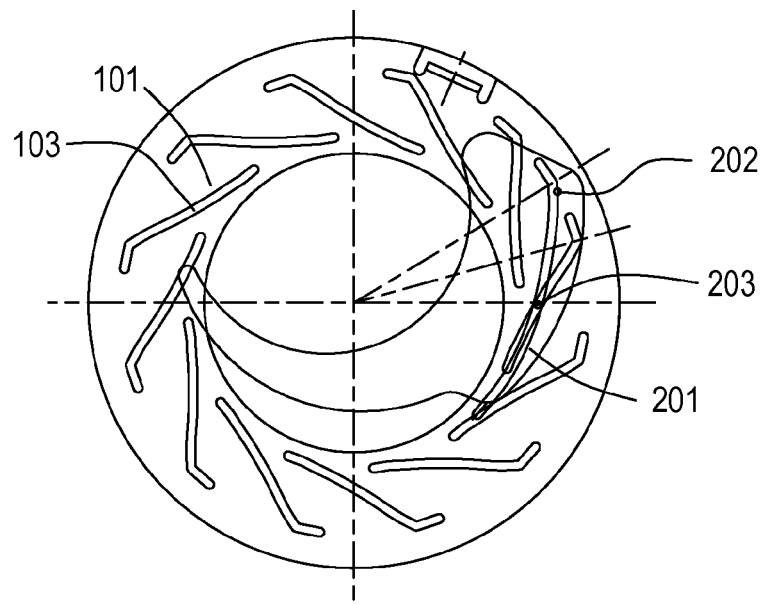
FIG. 10B is a diagram showing relationship between two types of cam grooves and stop blades in the first embodiment.
Figure 10C:
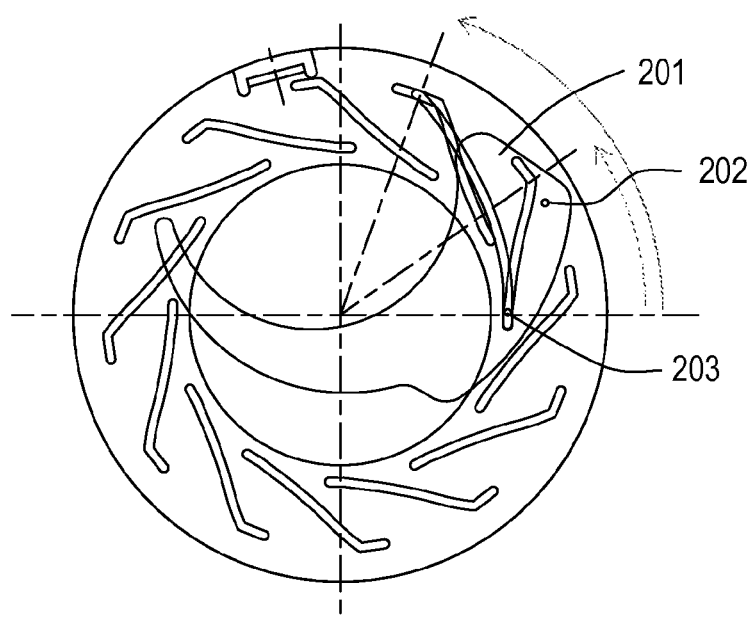
FIG. 10C is a diagram showing relationship between two types of cam grooves and stop blades in the first embodiment.

FIGS. 10A, 10B, and 10C are related diagrams schematically showing interlocked motions of the first cam plate 11, the second cam plate 21, and a second stop blade 200. FIGS. 10A, 10B, and 10C show the overlapping parts in a see-through manner. In order to describe the operation focusing on the motion of one blade, only one second cam groove 21a and one second stop blade 200 are illustrated in these drawings.

Firstly, a case in which the aperture diameter of the stop apparatus 1 is decreased from the maximum diameter (full aperture) will be discussed.

In the full aperture state, the driving pin 203 of the second stop blade 200 engages the portions of the first cam groove 11a and the second cam groove 21a farthest from the optical axis, and the first cam plate 11, the second cam plate 21, and the second stop blade 200 are in the positional relationship shown in FIG. 10A.

As the stop operation ring 6 is rotated about the optical axis, rotational driving force or torque is transmitted to the second cam plate 21 by the stop interlock pin 7 connected to the stop operation ring 6 to cause the second cam plate 21 to rotate by an angle equal to the angle of rotation of the stop operation ring 6. Since the second can groove 21a of the second cam plate 21 engages with the driving pin 203 of the second stop blade 200, the driving pin 203 of the second stop blade 200 is guided in the direction toward the optical axis with the rotation of the second cam plate 21.

Figure 11:
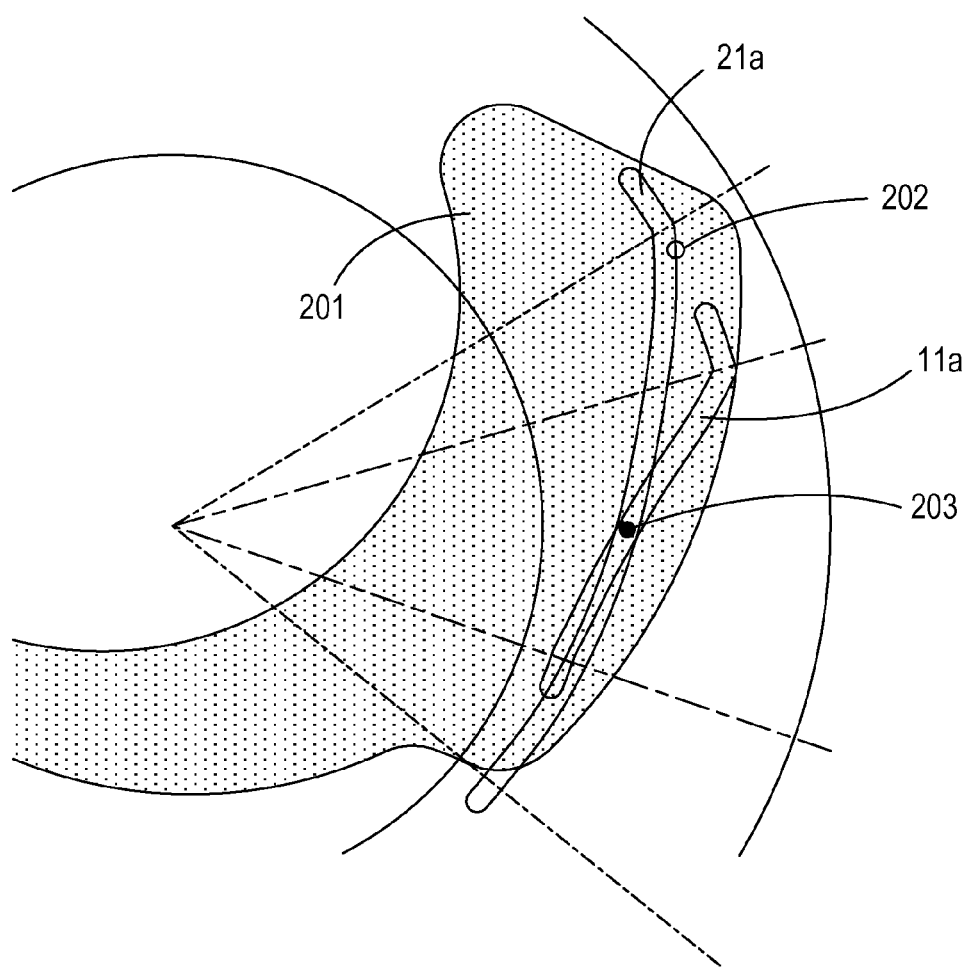
FIG. 11 is a diagram showing the operational relationship in the first embodiment in an enlarged manner.

Since the driving pin 203 of the second stop blade 200 engages with both the first cam groove 11a and the second cam groove 21a, the first cam plate 11 must be rotated to assume a phase in which the position of the driving pin 203 guided by the second cam groove 21a and the position of the first cam groove 11a coincide with each other as shown in FIG. 10B. In other words, simultaneously with the rotation of the second cam plate 21, the first cam plate 11 are rotated by the driving pin 203 in the same direction following the rotation of the second cam plate 21. FIG. 11 shows the state shown in FIG. 10B in an enlarged manner.

The driving pin 203 shifting closer to the optical axis exerts force to the first cam groove 11a, and the circumferential component of the reactive force on the slanted surface of the first cam groove 11a serves as a torque rotating the first cam plate 11. In this embodiment, this torque is generated at the six driving pins 203 in total, and moreover the torque of the second cam plate 21 is transmitted to the first cam plate 11 by frictional force acting between the first cam plate and the slide washer 31 and between the second cam plate 21 and the slide washer 31. Therefore, the first cam plate 11 can be driven to rotate smoothly in the same direction following the rotation of the second cam plate 21.

As the second cam plate 21 rotates with the rotation of the stop operation ring 6, the five second stop blades 200 that are not shown in FIG. 10A, 10B, or 10C also swing in the same manner as the illustrated stop blade with their driving pins 203 guided by the second cam grooves 21a. As the first cam plate 11 rotates passively, the six first stop blades 100 that are not shown in FIG. 10A, 10B, or 10C also swing in the same manner as the illustrated stop blade with their driving pins 103 guided by the first cam grooves 11a.

As the stop operation ring 6 is rotated further to the smallest aperture, the second cam plate 21 rotates by an angle equal to the angle of rotation of the stop operation ring 6, and the driving pin 203 is guided to the position closest to the optical axis in the second cam groove 21a and the first cam groove 11a, and the first cam plate 11 also further rotates accordingly. In this smallest aperture state, the first cam plate 11, the second cam plate 21, and the second stop blades 200 are in the positional relationship shown in FIG. 10C. In FIG. 10C, the amount of rotation of the second cam plate 21 and the amount of rotation of the first cam plate 11 with the change in the aperture of the stop from the full aperture to the smallest aperture are indicated by a solid arrow and a broken arrow respectively. As will be apparently seen from FIG. 10C, the amount of rotation of the second cam plate 21, which rotates by an angle equal to the angle of rotation of the stop operation ring 6, and the amount of rotation of the first cam plate 11 are greatly different from each other. Specifically, the amount of rotation of the first cam plate 11 is half the amount of rotation of the second cam plate 21.

The operation of the stop apparatus 1 in the case where the aperture diameter is increased from the smallest aperture to the full aperture is similar to the above-described operation. Specifically, the first cam plate 11 rotates passively following the rotation of the second cam plate 21, and the twelve stop blades swing in the same way while guided by the first cam grooves 11a and the second cam grooves 21a. In this operation, the amount of rotation of the first cam plate 11 is half the amount of rotation of the second cam plate 21.

In the stop apparatus according to this embodiment, the aperture of the stop is formed by a large number of stop blades, or twelve stop blades, and the operating ring can be operated to rotate by an angle of rotation larger than, or specifically twice as large as, the angle of rotation of the cam plate that controls the positions of the twelve stop blades.

Thus, this stop apparatus enables fine adjustment of the light quantity because of the large rotational operation angle, while having a stop aperture shape close to a circle.

While in the above-described illustrative embodiment the number of the second stop blades 200 guided by the second cam grooves 21a is half the total number of stop blades, the operation of this stop apparatus is not limited by this number of the second stop blades 200, but the same operation can be achieved, if the stop apparatus is provided with one or more second stop blades 200.

While in this embodiment the shape of the cam grooves are designed in such a way that the amount of rotation of the second cam plate 21 is twice as large as the amount of rotation of the first cam plate 11, it is possible to increase the amount of rotation of the second cam plate 21 by decreasing the number of the second stop blades 200, so long as the second cam grooves 21a do not interfere with each other.

It is not necessary that the amount of rotation of the second cam plate 21 and the amount of rotation of the first cam plate 11 be in a linearly proportional relationship, but the shapes of the two types of cam grooves may be designed in such a way that the amount of rotation is magnified nonlinearly.

Second Embodiment

Figure 12:
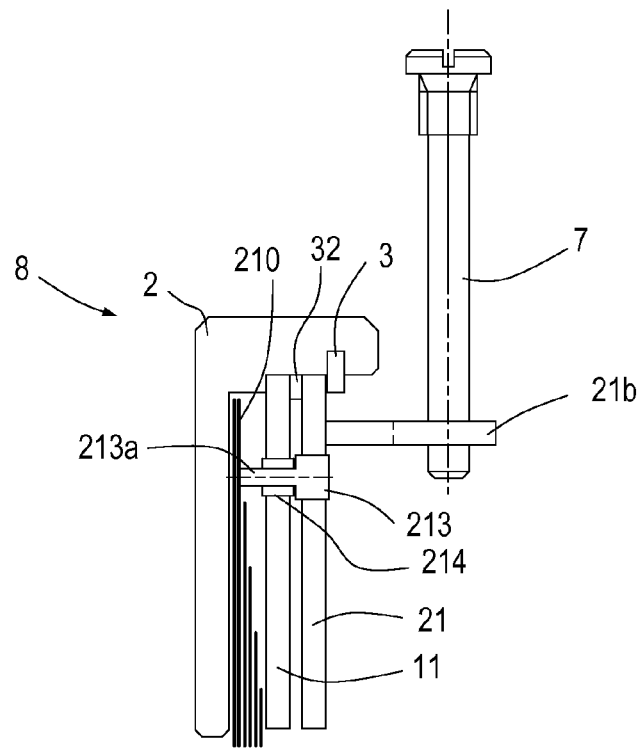
FIG. 12 is a side cross sectional view of a stop apparatus according to a second embodiment.

FIG. 12 is a side cross sectional view of a stop apparatus according to a second embodiment to which the present invention is applied. Components same as those in the first embodiment are denoted by the same reference characters. In the following, what is different from the first embodiment will be described.

Each of second stop blades 210 is provided with a pivot pin 202 projecting from its object side surface and a driving pin 213 projecting from the opposite surface facing toward the image pickup apparatus. A nearly half object side part (lengthwise) of the driving pin 213 has a diameter smaller than the other part, and a roller (rolling member) 214 rotatably engages on the outer circumference of the small diameter part (shaft) 213a. The first cam plate 11 and the second cam plate 21 are arranged side by side on the image pickup apparatus side of two types of stop blades 100, 210. The first cam plate 11 and the second cam plate are smoothly rotatable relative to the stop blade supporting cylinder 2. An annular smooth washer (friction member) 32 made of a low-friction material is provided between the first cam plate 11 and the second cam plate 21. The first cam plate 11, the second cam plate 21, and the smooth washer 32 are prevented from shifting in the optical axis direction by a press washer 3. The first cam plate 11 is provided with twelve first cam grooves 11a, with which the driving pins 103 of the first stop blades 100 and the rollers 214 on the outer circumference of the driving pins 213 of the second stop blades 210 engage alternately.

With the above-described structure, as the first cam plate 11 is rotated about the optical axis, the driving pins 103 and the rollers 214 are guided along the first cam grooves 11a, so that the stop blades 100, 210 swing around the respective pivot pins 102, 202 to change the aperture diameter.

On the other hand, the second cam plate 21, which is arranged adjacent to the first cam plate 11 with the smooth washer 32 between, is provided with six second cam grooves 21a, with which the driving pins 213 of the six second stop blades 210 engage respectively. In this embodiment, the rotation angle through which the second cam plate 21 rotates as the driving pins 213 shift from the positions farthest from the optical axis to the positions closest to the optical axis in the second cam grooves 21a is larger than, or specifically twice as large as, the rotation angle through which the first cam plate 11 rotates as the aperture diameter of the stop changes from the full aperture to the smallest aperture.

The operation of the stop apparatus 8 having the above-described structure according to this embodiment will be described in the following. Firstly, a case in which the aperture diameter of the stop apparatus 8 is decreased will be discussed.

As the second cam plate 21 is rotated by the operation of the stop operation ring 6 not shown, the driving pins 213 are guided in the direction toward the optical axis because the second cam grooves 21a of the second cam plate 21 and the driving pins 213 of the second stop blades 210 engage with each other. Since the rollers 214 on the small diameter parts 213a of the driving pins 213 engage with the first cam grooves 11a of the first cam plate 11, the first cam plate 11 are caused to rotate passively by means of the driving pins 213 and the rollers 214 simultaneously with the rotation of the second cam plate 21. In this operation, the driving pins 213 and the rollers 214 shifting closer to the optical axis exert force to the first cam grooves 11a, and the circumferential component of the reactive force on the slanted surfaces of the respective first cam grooves 11a serves as a torque rotating the first cam plate 11. In this embodiment, since the parts that are in contact with the first cam groove 11a include the rotatable rollers 214, the frictional resistance generated on the slanted surface of the first cam groove 11a is very low. Therefore, the first cam plate 11 can be rotated passively and smoothly by this torque generated at the six locations at which the rollers 214 are in contact with it. The angular ranges through which the driving pins 103 and the rollers 214 are guided by the first cam grooves 11a and the second cam grooves 21a respectively are designed in such a way that the amount of rotation of the first cam plate 11 is half the amount of rotation of the second cam plate 21. With the rotation of the second cam plate 21 and the following rotation of the first cam plate 11, the six first stop blades 100 and the six second stop blades 210 swing in the same way to change the shape of the stop aperture.

The operation of the stop apparatus 8 in the case where the aperture diameter is increased from the smallest aperture to the full aperture is similar to the above-described operation. Specifically, the first cam plate 11 rotates passively following the rotation of the second cam plate 21, and the twelve stop blades swing in the same way while guided by the first cam grooves 11a and the second cam grooves 21a. In this operation, the amount of rotation of the first cam plate 11 is half the amount of rotation of the second cam plate 21.

As described above, in the stop apparatus according to this embodiment, the aperture of the stop is formed by a large number of stop blades, or twelve stop blades, and the operating ring can be operated to rotate by an angle of rotation larger than, or specifically twice as large as, the angle of rotation of the cam plate that controls the positions of the twelve stop blades. Thus, this stop apparatus enables fine adjustment of the light quantity because of the large rotational operation angle, while having a stop aperture shape close to a circle.

In the stop apparatus according to the present invention it is desirable that the first cam grooves 11a and the second cam grooves 21a be slanted in the same direction, but the present invention is not limited by this particular feature. Because in the structure of this embodiment the first cam plate is driven to rotate only by torque transmitted to the slanted surfaces of the first cam grooves, the structure of this embodiment works, whether the direction of rotation of the first cam plate is the same as or opposite to the direction of rotation of the second cam plate.

While in the above-described embodiment the number of the second stop blades 210 guided by the second cam grooves 21*a* is half the total number of stop blades, the operation of this stop apparatus is not limited by this number of the second stop blades 210, but the same operation can be achieved, if the stop apparatus is provided with one or more second stop blades 210.

While in this embodiment the shape of the cam grooves are designed in such a way that the amount of rotation of the second cam plate 21 is twice as large as the amount of rotation of the first cam plate 11, it is possible to increase the amount of rotation of the second cam plate 21 by decreasing the number of the second stop blades 210, so long as the second cam grooves 21*a* do not interfere with each other.

It is not necessary that the amount of rotation of the second cam plate 21 and the amount of rotation of the first cam plate 11 be in a linearly proportional relationship, but the shapes of the two types of cam grooves may be designed in such a way that the amount of rotation is magnified nonlinearly.

Third Embodiment

Figure 13:
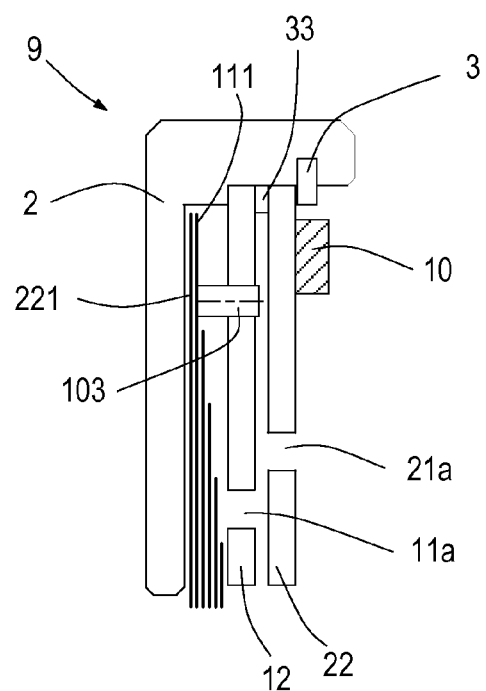
FIG. 13 is a side cross sectional view of a stop apparatus according to a third embodiment.

FIG. 13 is a partial side cross sectional view of a stop apparatus according to a third embodiment to which the present invention is applied. FIG. 13 is a partial side cross sectional view similar to FIG. 9 in the first embodiment, which is taken along line IX-IX in FIG. 2. Components same as those in the first embodiment are denoted by the same reference characters. In the following, what is different from the first embodiment will be described.

Each of first stop blades 110 and stop second blades 220 is provided with a pivot pin 102, 202 projecting from its object side surface and a driving pin 103, 203 projecting from the opposite surface facing toward the image pickup apparatus. The plate parts 111, 221 of these two types of stop blades have the same shape and are made of a non-magnetic material. The first cam plate 12 and the second cam plate 22 are arranged side by side on the image pickup apparatus side of two types of stop blades 110, 220. The first cam plate 12 and the second cam plate 22 are smoothly rotatable relative to the stop blade supporting cylinder 2. The first cam plate 12 is made of a magnetic material and provided with twelve first cam grooves 11*a* with which the driving pins 102 of the first stop blades 110 and the driving pins 203 of the second stop blades 220 engage alternately. On the other hand, the second cam plate 22 arranged adjacent to the first cam plate 12 is provided with six second cam grooves 21*a*, with which the driving pins 203 of the six second stop blades 220 engage respectively. A magnet 10 is fixedly attached to a portion of the second cam plate 22.

In this embodiment, the rotation angle through which the second cam plate 22 rotates as the driving pins 203 shift from the positions farthest from the optical axis to the positions closest to the optical axis in the second cam grooves 21*a* is larger than, or specifically twice as large as, the rotation angle through which the first cam plate 12 rotates as the aperture diameter of the stop changes from the full aperture to the smallest aperture.

An annular washer (friction member) 33 is provided between the first cam plate 12 and the second cam plate 22 in order to prevent interference of the ends of the driving pins 103 of the first stop blades 110 and the second cam plate 22 and to control attracting force acting between the magnet 10 and the first cam plate 12 made of a magnetic material.

The operation of the stop apparatus 9 according to this embodiment having the above described structure will be described in the following.

As the second cam plate 22 is rotated by the operation of the stop operation ring 6 not shown, the driving pins 203 shifting closer to the optical axis exert force to the first cam groove 11*a*, and the circumferential component of the reactive force on the slanted surfaces of the first cam grooves 11*a* serves as a torque rotating the first cam plate 12. In this embodiment, in addition to this torque, constant frictional force acts between the first cam plate 12 and the second cam plate 22 via the washer 33 with the aid of the attractive force of the magnet 10, whereby the torque of the second cam plate 22 is transmitted to the first cam plate 12. Therefore, the first cam plate 12 rotates smoothly in the same direction following the rotation of the second cam plate 22. The angular ranges through which the driving pins 103 and 203 are guided by the first cam grooves 11*a* and the second cam grooves 21*a* respectively are designed in such a way that the amount of rotation of the first cam plate 12 is half the amount of rotation of the second cam plate 22. With the rotation of the second cam plate 22 and the following rotation of the first cam plate 12, the six first stop blades 110 and the six second stop blades 220 swing in the same way to change the shape of the stop aperture.

As described above, in the stop apparatus according to this embodiment, the aperture of the stop is formed by a large number of stop blades, or twelve stop blades, and the operating ring can be operated to rotate by an angle of rotation larger than, or specifically twice as large as, the angle of rotation of the cam plate that controls the positions of the twelve stop blades. Thus, this stop apparatus enables fine adjustment of the light quantity because of the large rotational operation angle, while having a stop aperture shape close to a circle.

In the structure according to this embodiment, it is easy to control the frictional force acting between the first cam plate 12, the second cam plate 22, and the washer 33 so as to make it constant by attractive force of the magnet 10. Therefore, the operation torque can be made stable. Moreover, if the driving pins 103, 203 are made of a magnetic material, the driving pins 103, 203 are offset in the cam grooves 11*a* and 21*a* of the cam plates. This can further enhance the accuracy and the responsivity of the change in the aperture diameter in response to stop operations.

While in the above-described embodiment the number of the second stop blades 220 guided by the second cam grooves 21*a* is half the total number of stop blades, the operation of this stop apparatus is not limited by this number of the second stop blades 220, but the same operation can be achieved, if the stop apparatus is provided with one or more second stop blades 220.

While in this embodiment the shape of the cam grooves are designed in such a way that the amount of rotation of the second cam plate 22 is twice as large as the amount of rotation of the first cam plate 12, it is possible to increase the amount of rotation of the second cam plate 22 by decreasing the number of the second stop blades 220, so long as the second cam grooves 21*a* do not interfere with each other.

It is not necessary that the amount of rotation of the second cam plate 22 and the amount of rotation of the first cam plate 12 be in a linearly proportional relationship, but the shapes of the two types of cam grooves may be designed in such a way that the amount of rotation is magnified nonlinearly.

While in the embodiments described in the foregoing, the first stop blades 100 and the second stop blades 200 are provided with the pivot pins 102, 202 projecting from their object side surfaces, and the pivot pins 102, 202 engage with the engagement holes 2*a* provided on the stop blade supporting cylinder 2. However, the present invention is not limited to this. The apparatus may be designed in such a way that pivot pins projecting from the stop blade supporting cylinder (blade supporter) engage with engagement holes provided on the first stop blades 100 and the second stop blades 200.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-164810, filed Aug. 8, 2013 which is hereby incorporated by reference herein in its entirety.

What is claimed is:

1. A stop apparatus comprising:
a stop operation member;
a plurality of stop blades each provided with a pivot and a driving pin;
a blade supporter that supports the stop blades so that the stop blades are rotatable about the pivots of the respective stop blades;
a first cam member provided with a first cam groove that engage the driving pins of the respective stop blades;
a second cam member provided with a second cam groove having a shape different from the first cam groove; and
a driving force transmission member that transmits rotational driving force of the stop operation member to the second cam member,
wherein at least one of the driving pins engages with both the first cam groove and the second cam groove, and
wherein part of the rotational driving force transmitted from the driving force transmission member to the second cam member is transmitted to the first cam member through the second cam member to rotationally drive the first cam member.

2. The stop apparatus according to claim 1, wherein the angular range through which the second cam groove guides the driving pin is larger than the angular range through which the first cam groove guides the driving pin.

3. The stop apparatus according to claim 1, further comprising a friction member provided between and in contact with the first cam member and the second cam member.

4. The stop apparatus according to claim 1, wherein the driving pin that engages with both the first cam groove and the second cam groove comprises a shaft engaging with the second cam groove and a rolling member provided rotatably on the outer circumference of the shaft and engaging with the first cam groove.

5. The stop apparatus according to claim 1, wherein the first cam member is made of a magnetic material, and a portion of the second cam member is provided with a magnet.

6. The stop apparatus according to claim 1, wherein the pivot comprises a hole that engages a pin provided on the blade supporter.

7. The stop apparatus according to claim 1, wherein the pivot comprises a pivot pin that engages with a hole provided on the blade supporter.

8. The stop apparatus according to claim 1, wherein:
at least one of the driving pins engages with the first cam groove only,
one stop blade, among the plurality of stop blades, on which the driving pin engages with both the first cam groove and the second cam groove is driven by a rotational driving force transmitted from the driving force transmitting member to the second cam member,
another stop blade, among the plurality of stop blades, on which the driving pin engages with the first cam groove only is driven by a rotational driving force transmitted from the second cam member to the first cam member.

9. A lens apparatus comprising:
a plurality of optical components that form an optical image; and
a stop apparatus comprising:
a stop operation member;
a plurality of stop blades each provided with a pivot and a driving pin;
a blade supporter that supports the stop blades so that the stop blades are rotatable about the pivots of the respective stop blades;
a first cam member provided with a first cam groove that engages the driving pins of the respective stop blades;
a second cam member provided with a second cam groove having a shape different from the first cam groove; and
a driving force transmission member that transmits rotational driving force of the stop operation member to the second cam member,
wherein at least one of the driving pins engages with both the first cam groove and the second cam groove, and
wherein part of the rotational driving force transmitted from the driving force transmission member to the second cam member is transmitted to the first cam member through the second cam member to rotationally drive the first cam member.

10. The lens apparatus according to claim 9, wherein:
at least one of the driving pins engages with the first cam groove only,
one stop blade, among the plurality of stop blades, on which the driving pin engages with both the first cam groove and the second cam groove is driven by a rotational driving force transmitted from the driving force transmitting member to the second cam member,
another stop blade, among the plurality of stop blades, on which the driving pin engages with the first cam groove only is driven by a rotational driving force transmitted from the second cam member to the first cam member.

11. An image pickup apparatus comprising:
a lens apparatus comprising a plurality of optical components that form an optical image and a stop apparatus; and
a camera apparatus connected to the lens apparatus and having an image pickup element that photoelectrically converts the optical image formed by the plurality of optical components,
wherein the stop apparatus comprises:
a stop operation member;
a plurality of stop blades each provided with a pivot and a driving pin;
a blade supporter that supports the stop blades so that the stop blades are rotatable about the pivots of the respective stop blades;
a first cam member provided with a first cam groove that engages the driving pins of the respective stop blades;
a second cam member provided with a second cam groove having a shape different from the first cam groove; and
a driving force transmission member that transmits rotational driving force of the stop operation member to the second cam member,
wherein at least one of the driving pins engages with both the first cam groove and the second cam groove, and
wherein part of the rotational driving force transmitted from the driving force transmission member to the second cam member is transmitted to the first cam member through the second cam member to rotationally drive the first cam member.

12. The image pickup apparatus according to claim 11, wherein:
   at least one of the driving pins engages with the first cam groove only,
   one stop blade, among the plurality of stop blades, on which the driving pin engages with both the first cam groove and the second cam groove is driven by a rotational driving force transmitted from the driving force transmitting member to the second cam member,
   another stop blade, among the plurality of stop blades, on which the driving pin engages with the first cam groove only is driven by a rotational driving force transmitted from the second cam member to the first cam member.

* * * * *